US010780584B2

(12) United States Patent
Perrot et al.

(10) Patent No.: US 10,780,584 B2
(45) Date of Patent: Sep. 22, 2020

(54) REMOTELY OPERATED MANUAL WELDING METHOD AND WELDING ROBOT IMPLEMENTING SUCH A METHOD

(71) Applicant: COMMISSARIAT A L'ENERGIE ATOMIQUE ET AUX ENERGIES ALTERNATIVES, Paris (FR)

(72) Inventors: Yann Perrot, Sainte-Genevieve des Bois (FR); Max Da Silva Simoes, Massy (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 365 days.

(21) Appl. No.: 15/570,581

(22) PCT Filed: May 19, 2016

(86) PCT No.: PCT/EP2016/061330
§ 371 (c)(1),
(2) Date: Oct. 30, 2017

(87) PCT Pub. No.: WO2016/184985
PCT Pub. Date: Nov. 24, 2016

(65) Prior Publication Data
US 2018/0126556 A1 May 10, 2018

(30) Foreign Application Priority Data
May 20, 2015 (FR) ...................... 15 54520

(51) Int. Cl.
B25J 9/16 (2006.01)
(52) U.S. Cl.
CPC ........... *B25J 9/1689* (2013.01); *B25J 9/1664* (2013.01); *B25J 9/1679* (2013.01);
(Continued)

(58) Field of Classification Search
CPC ...... B25J 9/1689; B25J 9/1664; B25J 9/1679; G05B 2219/45135; G05B 2219/36417; G05B 2219/40432; G05B 2219/40074
See application file for complete search history.

(56) References Cited

U.S. PATENT DOCUMENTS 4,380,696 A * 4/1983 Masaki .................. B25J 19/023
219/124.34
4,969,108 A * 11/1990 Webb ..................... B25J 9/1684
219/124.34
(Continued)

FOREIGN PATENT DOCUMENTS

WO 2014/088994 A1 6/2014

OTHER PUBLICATIONS

International Search Report of PCT/EP2016/061330 dated Sep. 8, 2016 [PCT/ISA/210].

*Primary Examiner* — Jason Holloway
(74) *Attorney, Agent, or Firm* — Sughrue Mion, PLLC

(57) ABSTRACT

A method to assist with the production of an assembly of two elements implemented by a remotely operated robot. The method includes an arm, hinged to the end of which is mounted a heat-supply member suitable for delivering heat to a heat-supply point; position sensors; guiding actuators; a video capture device; an interface; and a processing unit. The method involves the following steps: acquiring a type of assembly to be produced; calculating a reference path of the heat-supply point; defining a shell for guiding the heat-supply member; and controlling guiding actuators so as to prevent the heat-supply member from moving out of the guiding shell.

21 Claims, 6 Drawing Sheets

(52) U.S. Cl.
CPC ............ *G05B 2219/36417* (2013.01); *G05B 2219/40074* (2013.01); *G05B 2219/40432* (2013.01); *G05B 2219/45135* (2013.01)

(56) References Cited

U.S. PATENT DOCUMENTS

| | | | |
|---|---|---|---|
| 6,314,631 B1* | 11/2001 | Pryor | A01B 69/008 29/407.04 |
| 8,326,460 B2* | 12/2012 | Ban | B25J 9/1697 700/259 |
| 10,394,327 B2* | 8/2019 | Chizeck | G06F 3/016 |
| 2011/0118752 A1 | 5/2011 | Itkowitz et al. | |
| 2013/0223724 A1* | 8/2013 | Wersborg | B23K 1/0056 382/152 |
| 2016/0059413 A1* | 3/2016 | Ogata | B25J 9/1676 700/186 |
| 2016/0318130 A1* | 11/2016 | Stempfer | B29C 64/153 |
| 2017/0157776 A1* | 6/2017 | Gosselin | B25J 3/04 |

* cited by examiner

REMOTELY OPERATED MANUAL WELDING METHOD AND WELDING ROBOT IMPLEMENTING SUCH A METHOD

CROSS REFERENCE TO RELATED APPLICATIONS

This application is a National Stage of International Application No. PCT/EP2016/061330, filed May 19, 2016, claiming priority based on French Patent Application No. 15 54520, filed May 20, 2015, the contents of all of which are incorporated herein by reference in their entirety.

TECHNICAL FIELD OF THE INVENTION

The present invention relates to the field of the assembly of elements by the application of heat, such as welding and brazing, and more particularly to assistance in carrying out such assemblies.

TECHNICAL BACKGROUND

Welding and brazing are reliable methods for the assembly of metallic or non-metallic elements by the application of heat. The portions of the elements to be assembled are placed facing one another and define a joint plane which is subjected to the application of heat, which may or may not be accompanied by the additional application of joint material. Brazing denotes methods in which the joint is formed by diffusion, that is to say without the melting of the elements to be assembled. Welding denotes methods in which the elements to be assembled are melted. Regardless of the methods used (MIG, TIG, submerged-arc, flux-cored wire, covered electrode, etc.), it is necessary to be able to control the path of the point of application of heat (electrode, torch flame, laser beam, etc.), its speed of movement relative to the assembly, and its distance from the elements to be assembled. The voltage, current and polarity of the arc, if an electric arc is used for the application of heat, the flow rate of gas, and the feed of any necessary filler material are further assembly parameters which have to be monitored, notably when there is a change of position during welding (in the case of tube welding, for example). These assembly parameters affect the quality of the resulting assembly (the braze or weld). Factors relating to the elements to be assembled, such as the degree of preparation of the assembly joint, notably the presence or absence of geometric defects in the joints, or local variations in the nature of the materials to be assembled, also affect the quality of the assembly. The assembly parameters must then be adapted in real time while the assembly is carried out. This is done by monitoring the weld pool (or braze pool), which is a reliable indicator of the conformity of the assembly parameters. The large number of parameters to be monitored, and the analysis of the weld pool, require a degree of expertise which it is difficult to automate. Thus, welding or brazing operations are usually carried out manually by qualified operators. These operators are then exposed to welding fumes, to the UV radiation of the heat source, and sometimes have to assume inconvenient positions, notably during the assembly of cylindrical elements which require what is known as an overhead posture, in which the heat application member is located under the assembly, usually requiring the operator to position the heat application member above him, in a particularly uncomfortable position. The intervention of an operator affects the repeatability of the assembly operations, and represents a source of uncertainty and therefore of variability in the quality of the completed assembly.

There are known automated welding robots which comprise an articulated arm on which a welding torch, usually of the MIG or MAG type, is mounted, and which are programmed to move the torch according to predefined parameters on a known path. There are also known orbital welding robots in which the welding torch is mounted on an annular support concentric with the tubes to be joined. An orbital welding robot virtually requires a robot specific to each tube diameter, and is limited for practical purposes to butt-joined assemblies, ruling out the automation of certain types of assembly such as seam welding. Such robots require thorough preparation of the elements to be assembled and a number of tests to determine the welding parameters. Each type of assembly must be specially programmed and requires new tests until the welding parameters are validated. This lack of versatility makes these robots unsuitable for one-off production or small or medium production runs, which are therefore always handled by manual welding. Such forms of production therefore suffer from high variability in the quality of the completed assemblies, notably as a result of the particularly trying working conditions for the operators.

OBJECT OF THE INVENTION

One object of the invention is to improve the quality of manual assemblies carried out by the application of heat.

SUMMARY OF THE INVENTION

For this purpose, a method is provided for assisting in carrying out the assembly of two elements by the application of heat, for example a welded or brazed joint, the method being executed by means of a remotely operated robot which comprises:
  an articulated arm at the end of which a heat application member, such as a nozzle or an electrode, is mounted, the heat application member being adapted to deliver heat at a point of application of heat;
  sensors of the position of the articulated arm;
  guidance actuators of the articulated arm;
  a device for video capture of the point of application of heat;
  an interface for controlling the path of the point of application of heat;
  a processing and control unit connected to the position sensors, to the guidance actuators, to the video capture device, and to the path control interface. According to the invention, the method comprises the following steps:
  a) acquiring a type of assembly to be carried out;
  b) calculating a reference path of the point of application of heat;
  c) defining a guidance envelope of the heat application member around the reference path;
  d) during the welding operation, controlling the guidance actuators in such a way that a movement of the heat application member in the guidance envelope is given preference.

Thus, the operator's ability to intervene in the welding parameters when necessary is maintained and reinforced by the fact that some parameters are controlled automatically by default. The operator is then able to concentrate fully on the critical parameters and their variation with regard to the behavior of the assembly at the point of application of heat.

Remote operation greatly improves the operator's working conditions, notably in respect of his exposure to fumes or UV radiation, and the convenience of the workstation. Finally, the haptic interface maintains the indispensable contribution of the operator's manual skills. The combination of these improvements in the conditions for the execution of the assembly has a positive effect on the quality of the assembly.

Advantageously, the interface for controlling the path of the point of application of heat is a haptic interface, and the method comprises the additional step of providing force feedback toward the haptic interface Also advantageously, the haptic interface comprises a master arm with force feedback. Such a haptic interface enables the method to be adapted to a large number of welding implements, while remaining as faithful as possible to the natural gesture usually made during manual assembly operations.

According to a particularly advantageous embodiment, step c) of defining a guidance envelope comprises the following steps:

c') generating, by means of the processing and control unit, a virtual articulated arm and a virtual heat application member;

c") generating a virtual guidance envelope, by means of the processing and control unit;

and step d) of controlling the guidance actuators comprises the following steps:

d') providing bilateral positional coupling between the haptic interface and the virtual articulated arm;

d") providing unilateral positional coupling from the virtual articulated arm toward the articulated arm;

d'") controlling the virtual articulated arm so as to oppose a movement of the virtual heat application member outside the virtual guidance envelope, while providing, on the one hand, unilateral positional coupling from the virtual articulated arm toward the articulated arm and bilateral positional coupling of the virtual articulated arm and the haptic interface.

The guidance of the virtual arm and its perception by the operator is then provided by the bilateral coupling which transfers the effect of the guidance forces toward the haptic interface and transfers the effect of the movements of the haptic interface toward the virtual arm. The movement of the articulated arm is provided by the unilateral positional coupling from the virtual articulated arm toward the articulated arm. The use of three-dimensional modeling makes it possible to reduce the resources required for the calculation of the interferences and the determination of the forces to be fed back by the processing and control unit toward the haptic interface. The application of guidance constraints to the virtual articulated arm only makes it possible to reduce the volume of commands to be sent toward the guidance actuators of the articulated arm, which then no longer need to exert resistant forces, but simply guidance forces.

Also advantageously, the guidance actuators are controlled so as to allow a sweeping movement of the point of application of heat on either side of the reference path, this sweeping movement being controlled by the operator from the haptic interface. The operator can then carry out assemblies of very thick and/or beveled elements which require a sweep between the two elements, particularly in the filling and finishing phases if the assembly is a welded joint.

According to a particular embodiment, the guidance actuators are controlled so as to constrain the point of application of heat to follow the reference path. This allows precise application of the point of application of heat, particularly for butt welds, and thus enables the area affected thermally by the application of heat to be limited, resulting in a higher-quality assembly.

According to another particular embodiment, step b) of calculating the reference path of the point of application of heat involves the use of at least one of the following parameters: the geometry of a joint plane, the geometry of the elements, and the method of assembly. The operator is then released from operations which do not relate exclusively to controlling the assembly at the point of application of heat, for example operations for controlling the interference of the arm with the elements to be assembled. For the same purpose, the definition of the guidance envelope may take into account at least one of the following requirements: maintaining the orthogonality or a condition of the positioning of the heat application member in relation to the surface of at least one of the elements, keeping the end of the heat application member in a joint plane, and avoiding collisions between the heat application member, the arm and the elements to be assembled.

Advantageously, the method according to the invention comprises the additional step of storing the type of assembly, the reference path of the point of application of heat, and the path of the point of application of heat that is actually followed. Thus, the processing unit may construct a library of paths and adapt the future calculations of reference paths of the point of application of heat according to the paths actually followed, using learning algorithms, for example. According to a preferred embodiment, the processing and control unit comprises means for controlling assembly parameters, the method comprising the step of adjusting the assembly parameters as a function of the location and/or the path of the point of application of heat relative to the assembly. The operator then no longer needs to be concerned about the control of the assembly parameters, because the processing unit acts on these as a function of the configuration and path of the robot. For example, in the case of tube welding by a TIG method, the parameters are initialized for a weld starting under the tubes to be assembled. As the welding torch rises, its inclination relative to the tangent surface is modified to ensure that the welding pool is "pushed" in the correct (upward) direction by the flow of shielding gas in a uniform manner, regardless of whether the operation is taking place under or above the component. This inclination also requires an adjustment of the current in the arc. This also concerns the speed of advance of the filler metal wire, whose unwinding speed can be controlled as a function of the speed of advance of the welder.

The invention also relates to a remotely operated robot comprising:

an articulated arm at the end of which a heat application member, such as a nozzle or an electrode, is mounted, the heat application member being adapted to deliver heat at a point of application of heat;

sensors of the position of the articulated arm;

guidance actuators of the articulated arm;

a device for video capture of the point of application of heat;

a haptic interface for controlling the path of the point of application of heat and the welding parameters;

a processing and control unit connected to the position sensors, to the guidance actuators, to the video capture device, to the haptic interface for controlling the welding path and parameters.

The processing unit is arranged to execute the method according to the invention.

Other characteristics and advantages of the invention will be apparent from the following description of non-limiting specific embodiments of the invention.

BRIEF DESCRIPTION OF THE DRAWINGS

Reference will be made to the attached figures, of which.

DETAILED DESCRIPTION OF THE INVENTION

Figure 1:
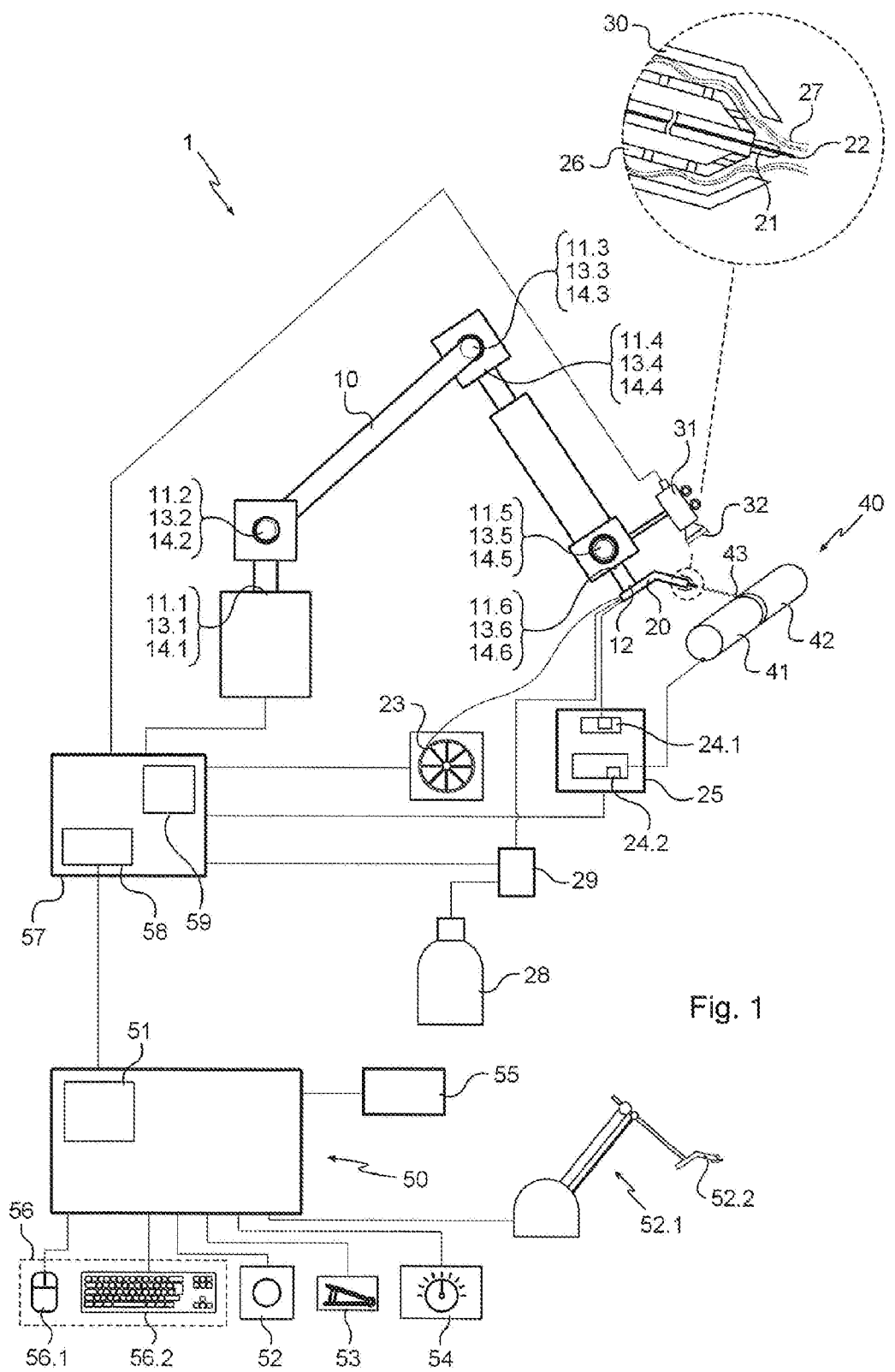
FIG. 1 is a schematic representation of a first embodiment of a remotely operated robot.

With reference to FIG. 1, the method is executed by means of a remotely operated robot, designated in a general way by the number 1, comprising a polar arm 10 with six axes, having six joints 11.1 to 11.6 of the rotary type.

A MIG welding torch 20 is mounted at the end 12 of the arm 10, and comprises a tubular guide 21 for a metal wire 22 running from a controlled unwinder 23. The guide 21 is connected to the positive terminal 24.1 of an electric welding generator 25. An assembly 40 of two metal tubes 41 and 42 is, for its part, connected to a second, ground terminal 24.2 of the generator 25. Thus the wire 22 acts as an electrode, and enables an electric arc to be struck, delivering heat to a point of application of heat 43 on the assembly 40. The MIG welding torch 20 also comprises a diffuser 26 for supplying shielding gas 27, argon in this case, from a reservoir 28 to which an expansion valve/flow meter assembly 29 is fitted. A tubular nozzle 30 extends around the guide 21 and the diffuser 26. The arm 10 also comprises sensors 13.1 to 13.6 for sensing its position, together with guidance actuators 14.1 to 14.6, fitted at each joint 11.1 to 11.6 respectively. The arm 10 also comprises a liquid-cooled camera 31, positioned so as to capture an image of the point of application of heat 43. The camera 31 is equipped with an optical filter 32. The robot 1 also comprises a haptic interface 50 for controlling the path of the point of application of heat 43 and the welding parameters. The haptic interface 50 comprises, notably, a screen 51 which renders the images captured by the camera 31, a 6D joystick 52 of the Space-Navigator type produced by 3DConnexion (registered trademark), a master arm 52.1 with force feedback, equipped with a reproduction 52.2 of the welding torch 20, a pedal 53 for controlling the arc striking and the strength of the welding current, a manual controller 54 of the speed of supply of the wire 22, a controller 55 of the flow meter 29 of the shielding gas 27, and a selection and instruction interface 56 in the form of a mouse 56.1 and a keyboard 56.2. The master arm 52.1 with force feedback may be an arm of the Virtuose 6D type (registered trademark) produced by Haption.

Finally, a processing and control unit 57 comprises calculation means 58 and a memory 59, and is connected to the position sensors 13.1 to 13.6, to the guidance actuators 14.1 to 14.6, to the camera 31, to the pedal 53, to the controllers 54 and 55, and to the haptic interface 50.

Figure 2:
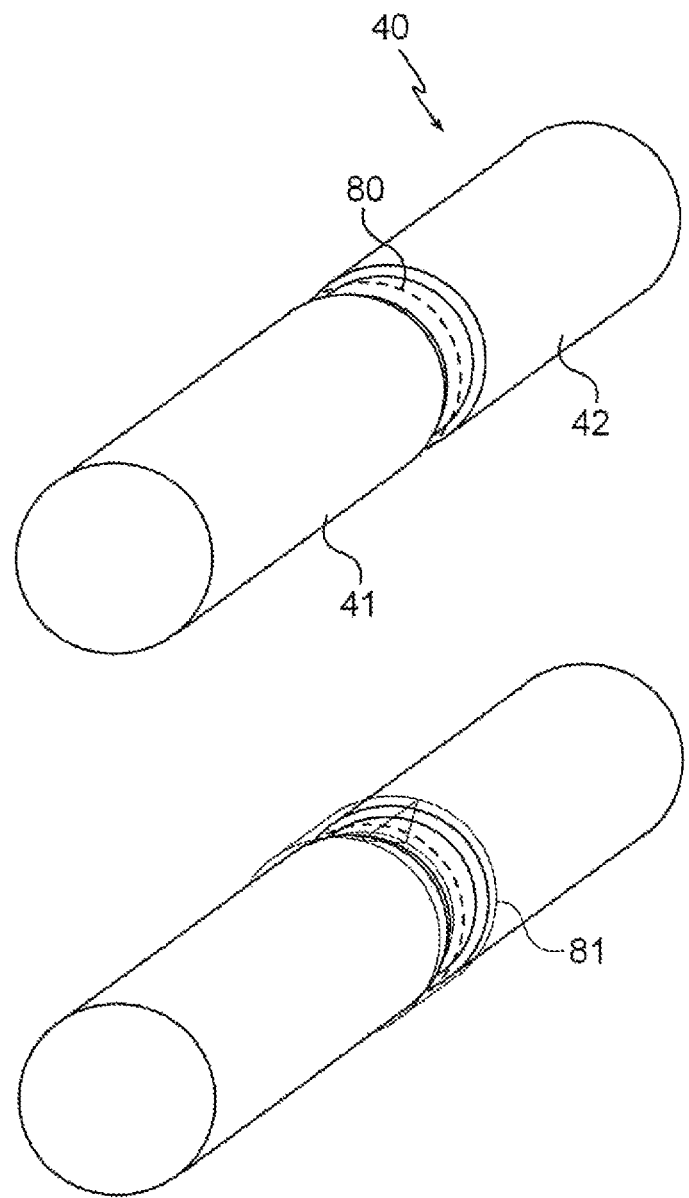
FIG. 2 is a perspective view of an assembly handled by the robot of FIG. 1.
Figure 3:
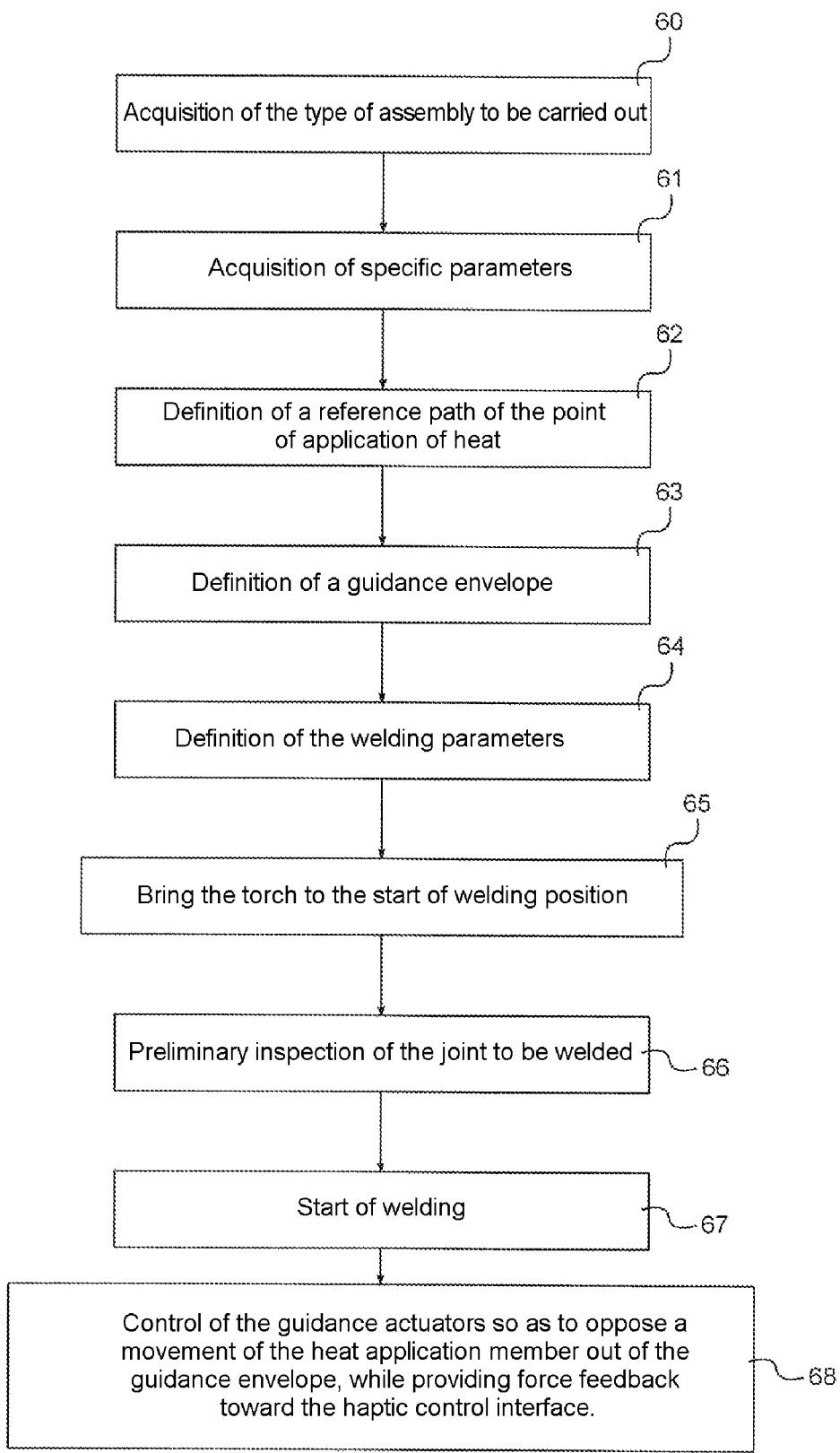
FIG. 3 is a flow chart of the steps of the method according to the first embodiment of the invention.

With reference to FIGS. 2 and 3, according to a first step 60 of the method, the operator selects the type of assembly to be carried out from among predefined assembly types (linear assembly, seam welds, etc.), using the interface 56. In this case, the operator selects a butt-joined assembly of tubes. This enables the processing unit 57 to acquire the type of assembly to be carried out. According to a second step 61, the operator moves the arm 10 until the guide 21 comes into contact with the outside of the tube 41. This contact is identified by the unit 57, which measures a zero resistance between the terminals 24.1 and 24.2 of the generator 25. Two other captures of points on the outside of the tube 41 enable the unit 57 to determine the diameter of the tube 41. The thickness of the tube can also be determined, either by an input via the keyboard 56.2, or by the measurement of a point located on the inside of the tube 41 by putting the guide 21 in contact with the inside of the tube 41, the axis of extension of the tubes 41 and 42 being known. Finally, the nature of the material of the tubes 41 and 42 can also be determined, by measuring the conductivity of the metal. This second step 61 is optional, since the acquisition of the type of assembly to be carried out and its specific parameters may take place by means of an input made by the operator via the interface 56.

According to a third step 62, the processing unit 57 calculates a reference path 80 of the point of application of heat 43 by using at least one of the following parameters: the geometry of a joint plane, the geometry of the elements, and the method of assembly. The joint plane is defined as a surface whose guide curve is the line of assembly of the elements 41 and 42 and whose surface contains the midpoints of the axes of the elements 41 and 42. The processing unit 57 will then define a linear path which avoids any interference between the torch 20, the robot 10 and the elements 41 and 42, and which is located in the joint plane. The distance between the end of the guide 21 and the elements to be welded is determined on the basis of the type of welding to be performed (short-arc welding, axial spray welding or globular transfer welding). It should be noted that the welding type may be set by default or selected via the interface 56. The welding type also determines the voltage and current ranges to be used.

Figure 4:
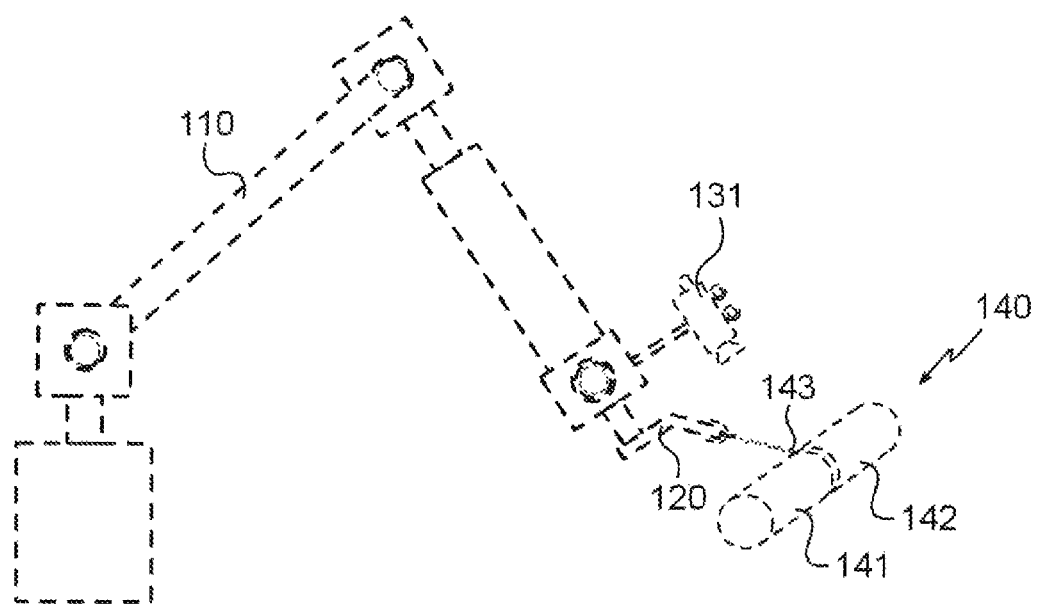
FIG. 4 is a schematic representation of a three-dimensional model of the robot of FIG. 1.

According to a particular embodiment, the unit 57 generates a virtual articulated arm 110 in the form of a three-dimensional computer model which corresponds at all points to the articulated arm 10 (in terms of geometry, degrees of freedom, etc.) and to its accessories, namely a virtual camera 131, a virtual torch 120 and virtual gas and wire feed lines 22. This three-dimensional computer model may also include a three-dimensional representation of the assembly 40 in the form of a virtual assembly 140. Finally, the articulated arm 110 comprises a virtual point of application of heat 143, corresponding to a position of the point of application of heat 43 calculated on the basis of the default welding parameters. The position of the virtual point of application of heat 143 is updated on the basis of the movements of the virtual articulated arm 110 and the variation of the welding parameters. Such a three-dimensional computer model is shown in FIG. 4.

The unit 57 provides bilateral positional coupling between the haptic interface—essentially the master arm 52.1 and/or the 6D joystick 52—on the one hand, and the virtual articulated arm 110 on the other hand. This means that the position of one of the coupled elements is transferred to the other in a bilateral way (from the first to the second, and from the second to the first). Thus, a change in the position of the master arm 52.1 is immediately reflected in the position of the virtual articulated arm 110. Similarly, a virtual constraint applied to the virtual articulated arm 110—interference with the assembly 140, for example—is manifested as a command defined by the unit 57 and sent to the master arm 52.1 so as to apply a resistive force to the master arm 52.1. Because of the bilateral coupling between the master arm 52.1 and the virtual articulated arm 110 provided by the unit 57, the guidance forces applied by the unit 57 to the virtual articulated arm 110 are transferred to the master arm 52.1 and are therefore perceived by the user. The unilateral coupling provided by the unit 57 from the virtual articulated arm 110 toward the arm 10 reproduces the position of the virtual arm 110 toward the arm 10.

If the 6D joystick 52 (a non-haptic interface for controlling the position of the point of application of heat 43) is used to perform the welding operations, the coupling between the 6D joystick 52 and the virtual articulated arm 110 is a unilateral force coupling: the movements of the 6D joystick exert a virtual force on the virtual articulated arm 110 proportional to the distance of the 6D joystick 52 from its rest position; the position of the virtual arm 110 does not affect the position of the 6D joystick 52, because the coupling is unilateral from the 6D joystick 52 toward the virtual articulated arm 110.

The unit 57 also controls the position of the guidance actuators 14.1 to 14.6 in such a way that the position of the virtual articulated arm 110 is reproduced on the articulated arm 10.

According to a third step 63, the unit 57 defines a guidance envelope 81 of the torch 20 around the reference path 80 defined in step 62. The definition of the guidance envelope takes into account at least one of the following requirements: maintaining the orthogonality or a condition of the positioning of the torch 20 in relation to the surface of the element 41 or 42, keeping the end of the guide 21 in the joint plane, and avoiding collisions between the torch 20, the arm 10 and the elements 41 and 42. The position condition may relate to the distance between the torch 20 and one of the elements 41 or 42, or the angle of the torch 20 to one of these elements 41 or 42. This position condition may be fixed or may vary according to the welding conditions. For example, the guidance envelope 81 may take into account the fact that the point of application of heat 43 must be closer to the assembly 40 when the welding position is the overhead position than when the welding position is the horizontal position. The inclination of the torch 20 may also vary according to the welding position and/or according to the obstacles that appear during the movement of the torch relative to the assembly. The unit 57 models this guidance envelope 81 of the torch 20 in the form of a virtual guidance envelope 181 of the virtual torch 120 extending around a virtual reference path 180 modeled in the environment of the virtual arm 110. According to a fourth step 64, the operator defines initial welding parameters (welding voltage and/or current, feeding speed of wire 22, flow rate of shielding gas 27). This step 64 is optional, since the operator may choose to retain default welding parameters or to validate welding parameters defined by the unit 57.

On completion of these operations, the assembly of the elements may begin.

According to a step 65, the processing unit 57 controls the guidance actuators 14.1 to 14.6 so as to bring the torch 20 to its calculated position for the start of welding, in this case under the assembly 40. This step is optional, since this positioning of the start of welding may be performed by the operator, using the master arm 52.1 and/or the 6D joystick 52. According to an optional monitoring step 66, the operator may also make a preliminary inspection of the joint to be welded, using the camera 32, by manipulating the arm 10 using the 6D joystick 52 or the master arm 52.1, or by commanding the unit 57 to control the guidance actuators 14.1 to 14.6 so that the arm 10 describes the movement corresponding to the movement of the point of application of heat 43 along the reference path 80. According to a step 67, the operator commences the start of welding. This welding step is initiated by the striking of the electric welding arc by means of the pedal 53, which the operator may also use to adjust the strength of the welding current. At substantially the same time as the striking, the controllers 54 and 55 initiate the feed of wire 22 and shielding gas 27, respectively, according to the previously defined welding parameters. Finally, when the electric arc has been established between the tube 21 and the assembly 40, the unit 57 controls the haptic interface 50—and more particularly the force feedback toward the master arm 52.1—in such a way as to keep the speed of movement of the virtual point of application of heat 143 relative to the virtual assembly 140 at a speed in the range from fifteen to forty centimeters per minute along the virtual reference path 180. This control is perceived by the operator via the haptic interface 50, and the unit 57 also controls the guidance actuators 14.1 to 14.6 of the articulated arm 10 in such a way that the articulated arm 10 reproduces the position of the virtual articulated arm 110, and therefore reproduces the constraint of keeping the speed within the defined range. Other constraints applied to the haptic interface, such as the orientation of the torch 20, the distance between the latter and the weld pool (the length of wire unwound), or alternatively the speed and/or amplitude of sweeping, are also reproduced.

During the assembly operation, the operator monitors on the screen 51 the image captured by the camera 31 of the point of application of heat 43, and thus analyzes the weld pool. He can consequently make adjustments to the welding parameters (current strength, wire speed, gas flow rate, electric arc length, polarity of the voltage, etc.) and to the movement of the point of application of heat 43 via the 6D joystick 52 and/or the master arm 52.1. The operator can also adjust the position of the MIG welding torch 20 by acting directly on the master arm 52.1 so as to move the point of application of heat 43 according to the state of the weld pool. All the modifications of the position of the master arm 52.1 are transmitted to the unit 57. According to a step 68, the unit controls virtual guidance forces on the virtual arm 110 so as to oppose any movement of the virtual torch 120 outside the virtual guidance envelope 181. The bilateral coupling between the virtual arm 110 and the master arm 52.1 provided by the control unit 57 enables the virtual guidance to be returned to the operator via the master arm 52.1. The position of the virtual arm 110, which is subject to the combined actions of the operator, via the coupling with the master arm 52.1, and to the guidance forces controlled by the unit 57, is reproduced on the articulated arm 10.

The control of the guidance actuators 14.1 to 14.6 of the arm 10 so as to oppose a movement of the point of application of heat 43, rather than the application of resistive forces to the reproduction 52.2 of the welding torch 20 of the master arm 52.1 of the haptic controller 50, improves the precision and effectiveness of the guidance for the purposes of the method, owing to the greater control reactivity. This is because remote operation introduces time lags between the articulated arm 10 and the haptic interface 50. By acting as closely as possible to the method on the arm 10, it is ensured that the guidance instructions generated by the processing and control unit are executed as rapidly as possible at the arm 10, without the addition of the time lag of the coupling between the haptic interface 50 and the articulated arm 10. This time lag may be significant if there is a considerable distance between the articulated arm 10 and the haptic interface 50.

The processing and control unit 57 controls a representation of the position of the virtual articulated arm 110 and its environment. Introducing guidance on the haptic interface 50 would have required a representation of this haptic interface 50 in the virtual space and a transformation of the guidance instructions for the arm 110 toward the representation space of the haptic interface 50, followed by a return of these guidance forces applied to the representation of the haptic interface 50 toward the actual haptic interface 50. In addition to the fact that this would create an additional computing workload for the processing and control unit 57, the main consideration is that the effect of the method on the rigidity of the guidance is improved. By eliminating intermediate stages (models, transformations, time lags), the control architecture adopted here enables a considerable degree of rigidity to be obtained for the guidance: the user clearly perceives the guidance and he must make a deliberate effort to escape from it.

The unit 57 may cause the application of elastic forces opposing the movement of the virtual welding torch 120, the intensity of these forces increasing as the boundaries defined by the virtual guidance envelope 181 are approached, or may apply a zero force inside the virtual guidance envelope 181, followed by an elastic reactive stop force when the virtual welding torch 120 reaches the boundaries of the virtual guidance envelope 181.

The control of the force feedback by the unit 57 on the virtual arm 110 may also allow or restrict other movements, for example:

a) by allowing a sweeping movement of the virtual point of application of heat 143 on either side of the virtual reference path 180, this sweeping movement being controlled by the operator from the haptic interface 50;

b) or by constraining the point of application of heat 43 to follow the reference path 80.

The sweeping movement of the virtual point of application of heat 143 may also be the subject of a command sent by the unit 57 to the master arm 52.1 for the purpose of generating an elastic force when the welding torch approaches boundaries defined by the virtual guidance envelope 181. The unit 57 may alternatively cause the application, by the force feedback of the master arm 52.1, of a zero force inside the virtual guidance envelope 181, followed by an elastic reactive stop force when the virtual welding torch 120 reaches the boundaries of the virtual guidance envelope 181.

It should be noted that the guidance envelope 81 defines the possible positions of the heat application member—in this case the end of the wire 22 of the MIG welding torch 20—when the reference path 80 defines a theoretical path of the point of application of heat 43. Inside the guidance envelope 81, the heat application member may adopt a plurality of positions in which the point of application of heat 43 remains on the reference path 80. These various possible positions make it possible to avoid collisions and maintain good visibility of the weld pool, or to elongate the electric welding arc without modifying the position of the point of application of heat 43. The point of application of heat 43 may also deviate from the reference path 80, as long as the heat application member remains in the guidance envelope. In all circumstances, the definition of the guidance envelope 81 allows for the possibilities of movement of the point of application of heat 43. The same considerations apply to the virtual guidance envelope 181, the virtual torch 120, the virtual reference path 180 and the virtual point of application of heat 143.

According to an optional step 69, when the welding is completed, the operator carries out a display pass in which the unit 57 controls the guidance actuators 14.1 to 14.6 in such a way that the camera 31 sweeps the whole of the weld, thus enabling the operator to make a visual inspection of the weld.

According to a particular embodiment, the unit 57 stores the type of assembly, the reference path 80 of the point of application of heat 43, and the path actually followed by the point of application of heat 43. A learning algorithm integrated into the unit 57 enables the calculation of the future reference paths to be adjusted on the basis of the paths actually followed for similar assemblies.

Elements identical or similar to those described above will be given an identical reference numeral in the following description of the second embodiment of the invention.

Figure 5:
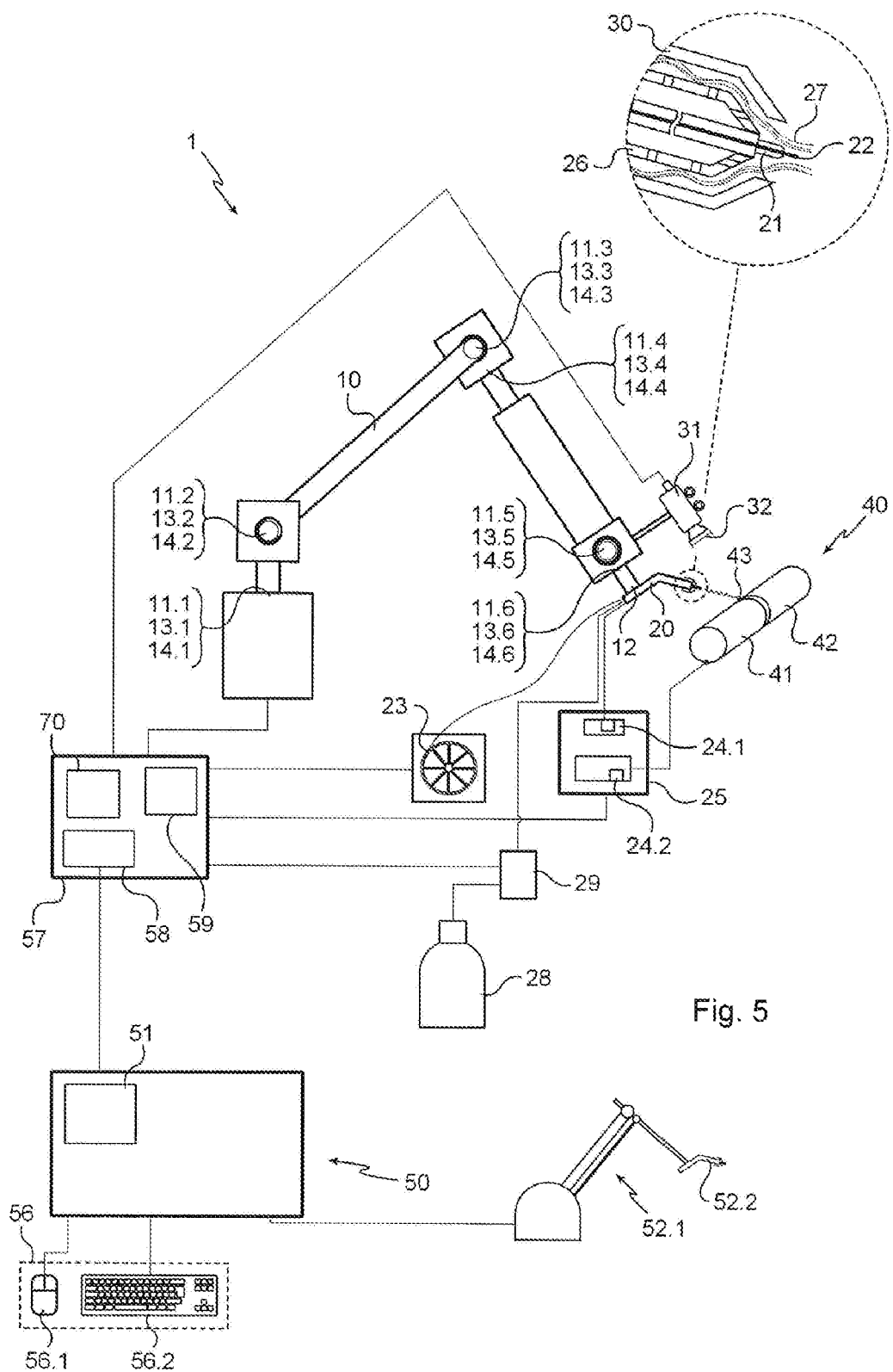
FIG. 5 is a schematic representation of a second embodiment of a remotely operated robot.
Figure 6:
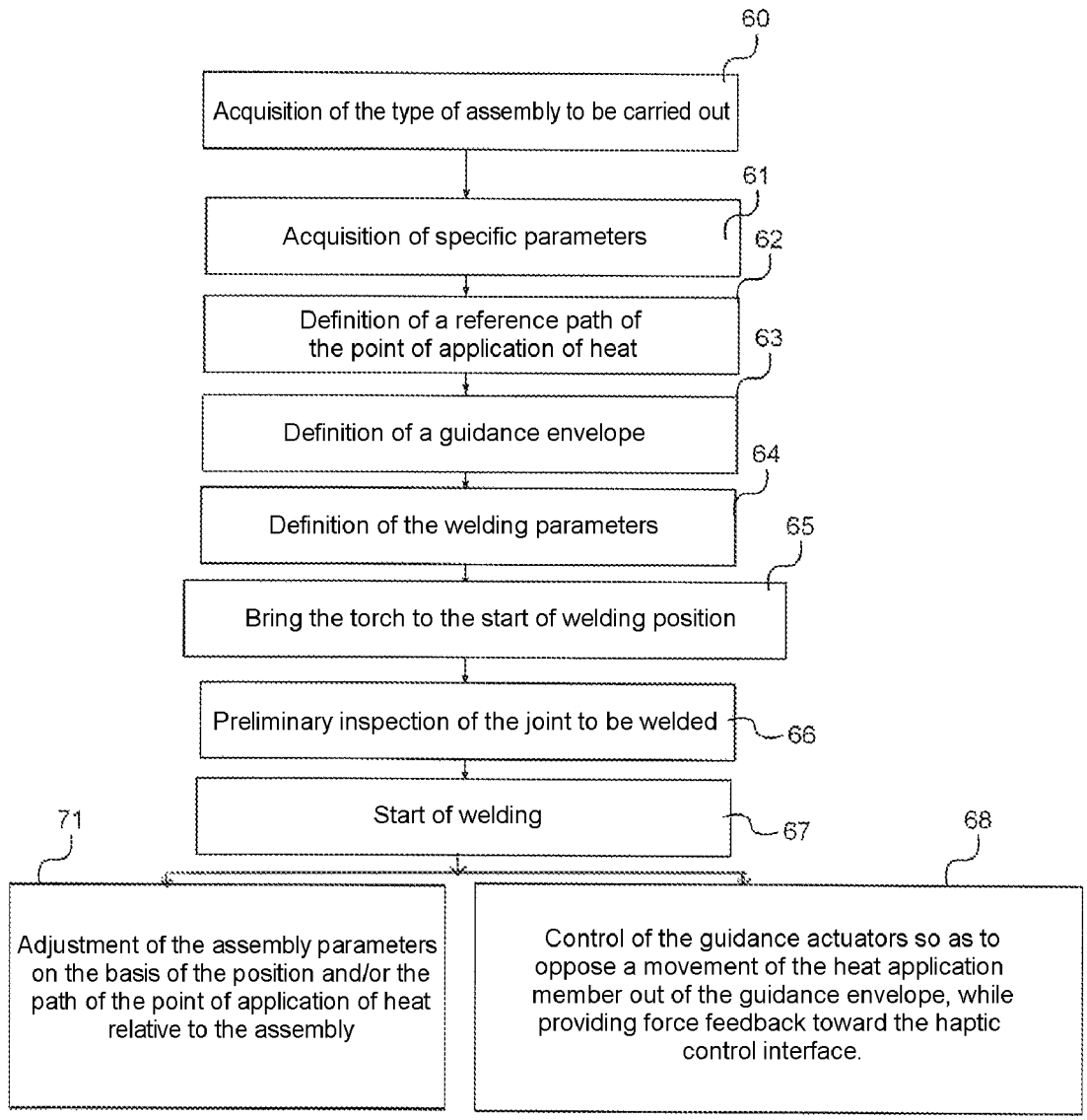
FIG. 6 is a flow chart of the steps of the method according to the second embodiment of the invention.

With reference to FIGS. 5 and 6, the haptic interface 50 of the remotely operated arm 1 comprises a screen 51 which renders the images captured by the camera 31, a master arm 52.1 with force feedback, equipped with a reproduction 52.2 of the welding torch 20, and a selection and instruction interface 56 in the form of a mouse 56.1 and a keyboard 56.2. The control and processing unit 57 comprises an electronic circuit card 70 for controlling the assembly parameters, which include:

the strength and type (direct or alternating) of welding current;

the polarity and value of the welding voltage;

the feeding speed of the wire 22;

the flow rate of shielding gas 27.

The method of assistance in carrying out the assembly 40 according to the second embodiment of the invention comprises the same steps 60 to 67 as those of the first embodiment. Simultaneously with step 68 of controlling the guidance actuators, a step 71 of adjusting the welding parameters is executed by the card 70 of the control and processing unit 57 on the basis of the position and/or the path of the point of application of heat 43.

Thus, if the processing and control unit 57 determines that the assembly 40 is located above the point of application of heat 43, it causes the strength of the welding current to be reduced, via the card 70, and adjusts the other welding parameters on the basis of this. As the welder moves the reproduction 52.2 of the welding torch of the master arm 52.1, the processing and control unit 57 reproduces this movement on the slave arm 10 and therefore moves the point of application of heat 43. During this movement, the relative positions of the point of application of heat 43 and the assembly 40 varies, and the processing and control unit 57, via the card 70, adjusts the assembly parameters, including:

the strength of the welding current;

the value of the welding voltage (reduced in the overhead position and then increased with a change to vertical-up welding);

the feeding speed of the wire 22;

the flow rate of shielding gas 27.

The path (sweep, speed of movement) of the point of application of heat 43 is also taken into account in step 70 of adjusting the welding parameters.

The control of the assembly parameters in the course of welding by the control and processing unit 57 makes it possible to reduce the number of parameters to be monitored by the operator during the welding. The operator can then concentrate exclusively on the manipulation of the reproduction 52.2 of the welding torch 20. Since the control and processing unit 57 also controls the interference of the arm 10 with the assembly 40 and its environment, the operator's task is made easier, thereby reducing fatigue and incidentally the number of defects, and increasing productivity.

Clearly, the invention is not limited to the embodiments described above, but incorporates all variants falling within the scope of the invention as defined by the claims.

In particular, although the assembly comprises two elements, here in the form of two butt-joined tubes, the invention is equally applicable to other types of assembly, for example the seam welding of tubes oriented at an angle in the range from 0° to 180°, the assembly of flat products which are butt-joined or edge welded, or assembly using a tube and a flat product;

although the assembly is carried out by welding here, the invention is equally applicable to other types of assembly by application of heat, for example brazing;

although the articulated arm is a six-axis arm here, the invention is equally applicable to other types of arm, for example arms having a different number of axes or having a different number of degrees of freedom;

although the robotic arm is here a polar arm comprising rotary joints only, the invention is equally applicable to other types of robotic arms, for example a Cartesian arm comprising prismatic and rotary joints;

although the robot is here equipped with a MIG welding torch, the invention is equally applicable to other welding methods, for example MAG, flux-cored wire without shielding gas, coated electrode or submerged wire methods, or alternatively TIG methods or flame, laser beam or induction brazing methods;

although the heat application member here comprises a guide tube biasing a wire acting as a fusible electrode, the invention is equally applicable to other types of heat application member, for example a nonfusible electrode made of tungsten (the TIG method) or other material, or a nozzle for the diffusion of a heating gas (such as acetylene);

although the welding torch here incorporates the device for feeding filler metal, the invention is equally applicable to other types of method not using filler metal (welding without filler metal) or those in which the filler metal is brought to the weld pool by a device independent of the device that comprises the heat application member;

although the feeds of filler metal are here initiated automatically, the invention is equally applicable to manually initiated feeds of filler metal and gas;

although the point of application of heat is captured here by means of a liquid-cooled camera equipped with a filter, the invention is equally applicable to other types of video capture of the point of application of heat, for example a thermal camera or an HD photographic apparatus, and to other means of protection from radiation, for example an LCD screen with automatic dimming;

although the haptic interface here comprises a 6D joystick of the SpaceNavigator type and a master arm with force feedback equipped with a reproduction of a welding torch, the invention is equally applicable to other types of haptic interface, for example an interface equipped with two manipulators with force feedback, or alternatively one or more joysticks with force feedback;

although the master arm with force feedback here is of the Virtuose 6D type made by Haption, the invention is equally applicable to other models of master arm with force feedback and to other manufacturers of such arms;

although the acquisition of the assembly here takes place by means of the wire guide tube used as a contact sensor, the invention is equally applicable to other means of acquisition, for example means of two-dimensional acquisition such as a camera or a feeler, or means of three-dimensional acquisition, for example a 3D scanner, a pair of 2D cameras, or ultrasonic probes;

although the speed of movement of the heat application member here is in the range from fifteen to forty centimeters per minute, the invention is equally applicable to other predefined ranges of speed of movement of the heat application member, for example speeds of less than fifteen centimeters per minute or more than forty centimeters per minute;

although the processing and control unit here generates a virtual articulated arm and a virtual model of the attached accessories (camera, welding torch, etc.), the invention is equally applicable to modeling comprising a virtual arm and a virtual heat application member only;

although the method here comprises the generation of a virtual articulated arm and a virtual heat application member for the subsequent determination of a virtual guidance envelope, the invention is equally applicable to a method which does not include any steps of generation of virtual elements, and in which the interference situations and the coordinates of the various elements are calculated without the use of three-dimensional modeling. The processing and control unit then controls the guidance actuators directly in such a way that a movement of the heat application member outside the calculated guidance envelope is directly opposed. The direct connection of the haptic interface and the articulated arm enables the guidance forces applied to the articulated arm to be fed back toward the haptic interface so that the operator can perceive them;

although the virtual arm here is a three-dimensional computer model, the invention is equally applicable to other types of computer models, for example a wire frame or two-dimensional model;

although the control interface here comprises a master haptic arm and a 6D joystick, the invention is equally applicable to an interface comprising only a master arm (haptic or otherwise) or only a 6D joystick or other joystick (haptic or otherwise) for guiding the virtual arm or the articulated arm;

although the control interface here is haptic (that is to say, it has internal means for reproducing forces), the invention is equally applicable to other types of control interface, for example an interface without haptic feedback, such as a joystick of the Space-Mouse (registered trademark) type. The guidance forces applied to the arm 10 are not perceived by the operator, but he sees the effect of these forces on the movements of the arm 10 via the screen 51, and he retains the ability to depart from the guidance envelope;

although the assembly parameters here are controlled by an electronic circuit card integrated into the processing and control unit, the invention is equally applicable to other means for controlling the assembly parameters, for example a remote unit connected to the processing and control unit, or alternatively a subprogram incorporated into the processing and control unit.

The invention claimed is:

1. A method for assisting in carrying out the assembly of two elements by the application of heat, the method being executed by a remotely operated robot, the robot comprising:
   an articulated arm at the end of which a heat application member is mounted, the heat application member being adapted to deliver heat at a point of application of heat;
   sensors of the position of the articulated arm;
   guidance actuators of the articulated arm;
   a device for video capture of the point of application of heat;
   an interface for controlling the path of the point of application of heat;
   a processing and control unit connected to the position sensors, to the guidance actuators, to the video capture device, and to the interface for controlling the assembly path and parameters,
   the method comprising the following steps:
   a) acquiring a type of assembly to be carried out;
   b) calculating a reference path of the point of application of heat;
   c) defining a guidance envelope of the heat application member around the reference path;
   d) controlling the guidance actuators in such a way as to oppose a movement of the heat application member out of the guidance envelope.

2. The method as claimed in claim 1, wherein the interface for controlling the path of the point of application of heat is a haptic interface, and the method comprises the additional step of providing force feedback toward the haptic interface.

3. The method as claimed in claim 2, wherein the haptic interface comprises a master arm with force feedback.

4. The method as claimed in claim 2, wherein step c) of defining a guidance envelope comprises the following steps:
   c') generating, by means of the processing and control unit, a virtual articulated arm and a virtual heat application member;
   c''') generating a virtual guidance envelope, by means of the processing and control unit;
   and step d) of controlling the guidance actuators comprises the following steps:
   d') providing bilateral positional coupling between the haptic interface and the virtual articulated arm;
   d'') providing unilateral positional coupling from the virtual articulated arm toward the articulated arm;
   d''') controlling the virtual articulated arm so as to oppose a movement of the virtual heat application member outside the virtual guidance envelope, while providing, on the one hand, unilateral positional coupling from the virtual articulated arm toward the articulated arm and bilateral positional coupling of the virtual articulated arm and the haptic interface.

5. The method as claimed in claim 1, wherein step c) of defining a guidance envelope comprises the following steps:
   c') generating, by means of the processing and control unit, a virtual articulated arm and a virtual heat application member;
   c''') generating a virtual guidance envelope, by means of the processing and control unit;
   and step d) of controlling the guidance actuators comprises the following steps:
   d') providing unilateral positional coupling from the interface toward the virtual articulated arm;
   d'') providing unilateral positional coupling from the virtual articulated arm toward the articulated arm;
   d''') controlling the virtual articulated arm so as to oppose a movement of the virtual heat application member outside the virtual guidance envelope, while providing, on the one hand, unilateral positional coupling from the virtual articulated arm toward the articulated arm and unilateral force coupling from the haptic interface toward the virtual articulated arm).

6. The method as claimed in claim 1, wherein the guidance actuators are controlled so as to allow a sweeping movement of the point of application of heat on either side of the reference path, this sweeping movement being controlled by the operator from the haptic control interface.

7. The method as claimed in claim 1, wherein the guidance actuators are controlled so as to constrain the point of application of heat to follow the reference path.

8. The method as claimed in claim 1, wherein, the robot having means for the two-dimensional or three-dimensional acquisition of the assembly, the method comprises a step a'), placed between step a) and step b), of acquiring specific parameters of the assembly, using means of two-dimensional or three-dimensional acquisition.

9. The method as claimed in claim 1, wherein step b) of calculating the reference path of the point of application of heat involves the use of at least one of the following parameters: the geometry of a joint plane, the geometry of the elements, and the method of assembly.

10. The method as claimed in claim 1, wherein the definition of the guidance envelope takes into account at least one of the following requirements: maintaining the orthogonality or a condition of the positioning of the heat application member in relation to the surface of at least one of the elements, keeping the end of the heat application member in a joint plane, and avoiding collisions between the heat application member, the articulated arm and the elements.

11. The method as claimed in claim 1, comprising the additional step of storing the type of assembly, the reference path of the point of application of heat, and the path of the point of application of heat that is actually followed.

12. The method as claimed in claim 1, wherein the acquisition of the type of assembly is carried out by selecting a type of assembly from among predefined types of assembly.

13. The method as claimed in claim 1, wherein the guidance actuators are controlled so as to keep the speed of movement of the heat application member relative to the assembly within a predefined range.

14. The method as claimed in claim 1, wherein the processing and control unit comprises means for controlling the assembly parameters, the method comprising the step of adjusting the assembly parameters as a function of the location and/or the path of the point of application of heat relative to the assembly.

15. A remotely operated robot comprising:
   an articulated arm at the end of which a heat application member is mounted, the heat application member being adapted to deliver heat at a point of application of heat;
   sensors of the position of the articulated arm;
   guidance actuators of the articulated arm;
   a device for video capture of the point of application of heat;
   a haptic interface for controlling the path of the point of application of heat;
   a processing and control unit connected to the position sensors, to the guidance actuators, to the video capture device, and to the haptic interface for controlling the path of the point of application of heat, the processing and control unit being arranged to execute the following method for assisting in carrying out the assembly of two elements by the application of heat:

a) acquire a type of assembly to be carried out b) calculate a reference path of the point of application of heat c) define a guidance envelope of the heat application member around the reference path;

d) control the guidance actuators in such a way as to oppose a movement of the heat application member out of the guidance envelope.

16. The remotely operated robot as claimed in claim 15, comprising a manual interface for controlling the assembly parameters.

17. A remotely operated robot comprising:

an articulated arm at the end of which a heat application member is mounted, the heat application member being adapted to deliver heat at a point of application of heat;

sensors of the position of the articulated arm;

guidance actuators of the articulated arm;

a device for video capture of the point of application of heat;

a haptic interface for controlling the path of the point of application of heat;

a processing and control unit connected to the position sensors, to the guidance actuators, to the video capture device, and to the haptic interface for controlling the path of the point of application of heat, the processing and control unit comprising means for controlling the assembly parameters, the processing and control unit being arranged to execute the following method for assisting in carrying out the assembly of two elements by the application of heat:

a) acquire a type of assembly to be carried out;

b) calculate a reference path of the point of application of heat;

c) define a guidance envelope of the heat application member around the reference path;

d) control the guidance actuators in such a way as to oppose a movement of the heat application member out of the guidance envelope, and adjust the assembly parameters as a function of the location and/or the path of the point of application of heat relative to the assembly.

18. The method as claimed in claim 1, wherein the assembly of the two elements by the application of heat is a welded or brazed joint.

19. The method as claimed in claim 1, wherein the heat application member is a nozzle or an electrode.

20. The method as claimed in claim 15, wherein the heat application member is a nozzle or an electrode.

21. The method as claimed in claim 17, wherein the heat application member is a nozzle or an electrode.

* * * * *